United States Patent [19]

Westwood et al.

[11] Patent Number: 5,015,491
[45] Date of Patent: May 14, 1991

[54] PRODUCTION OF ISOMERISED HOP EXTRACT

[75] Inventors: Keith T. Westwood, Crawyley Down; Allan Crescenzi, High Wycombe, both of England

[73] Assignee: The Brewing Research Foundation, Redhill, England

[21] Appl. No.: 405,935

[22] Filed: Sep. 12, 1989

[30] Foreign Application Priority Data

Sep. 13, 1988 [GB] United Kingdom ............ 8821420

[51] Int. Cl.$^5$ .............................................. C12C 3/00
[52] U.S. Cl. ..................................... 426/600; 568/377
[58] Field of Search ....................... 426/600; 568/377

[56]  References Cited

U.S. PATENT DOCUMENTS

| | | | |
|---|---|---|---|
| 3,298,835 | 1/1967 | Hildebrand | 426/600 |
| 3,354,219 | 11/1967 | Rigby | 426/600 |
| 3,594,178 | 7/1971 | Meisler | 426/600 |
| 3,686,316 | 8/1972 | Verzele | 426/600 |
| 3,765,903 | 10/1973 | Clarke | 426/600 |
| 3,839,588 | 10/1974 | Sweett | 426/600 |
| 3,875,316 | 4/1975 | Humphrey | 426/600 |
| 4,212,895 | 7/1980 | Laws | 426/600 |
| 4,302,479 | 11/1981 | Humphrey | 426/600 |
| 4,338,348 | 7/1982 | Muller | 426/600 |
| 4,395,431 | 7/1983 | Lance | 426/600 |
| 4,666,731 | 5/1987 | Todd | 426/600 |
| 4,717,580 | 1/1988 | Forrest | 426/600 |
| 4,780,330 | 10/1988 | Laws | 426/600 |
| 4,839,189 | 6/1989 | Forrest | 426/600 |
| 4,946,691 | 8/1990 | Burkhardt | 426/600 |

Primary Examiner—Carolyn Paden
Attorney, Agent, or Firm—Darby & Darby

[57]  ABSTRACT

A method for the production of an isomerised hop preparation comprises mixing together hop extract with a solid alkaline or alkaline earth metal salt, and subjecting the resulting mixture to a temperature of at least 80° C. for a time sufficient to effect conversion of α-acid to iso-α-acid. The method may be a stage in a process for brewing beer or the isomerised hop preparation may be further processed to produce high purity isomerised extracts.

7 Claims, 1 Drawing Sheet

Preparation of Isomerised Extract
Continuous and Batch Process

PRODUCTION OF ISOMERISED HOP EXTRACT

FIELD OF THE INVENTION

The present invention relates to the production of iso-α-acids by the isomerisation of α-acids in the form of a hop extract.

DESCRIPTION OF THE RELATED ART

Traditionally, hops are added to sweet wort during the boiling stage of the brewing process. This facilitates the extraction of hop resins such as α-acids (humulones) which are subsequently isomerised to iso-α-acids (isohumulones). It is these isohumulones which are responsible for the characteristic bitterness associated with beer. The extraction and isomerisation of humulones in boiling wort are inefficient and only 30-40% of these compounds are utilised in the brewing process.

It has long been established that isomerisation of humulones can take place more efficiently outside the brewing process and especially at alkaline pH. In order to obtain isomerised products of suitable purity, costly multi-stage processes are required. Early processes involved extraction of hops with organic solvents such as hexane, methylene chloride and methanol. The main drawback with the use of these solvents is the possibility of residues being present in the extract. Use of liquid and supercritical carbon dioxide for hop extraction overcomes the problem of solvent residues and, in the case of the former, gives rise to a purer extract. Despite this improvement, isomerisation processes still employed organic solvent such as hexane at some stage in order to purify the humulone or isohumulone further.

In GB-A-2022083 (Baker and Laws) the first organic solvent free isomerisation process was disclosed. Here, liquid carbon dioxide hop extract is isomerised by heating in dilute alkaline solution at a humulone concentration of 5-20%. The isohumulones so produced are then purified by removal of β-acid (lupulones) as described in EP-A-0020087 (Baker) and finally concentrated to 30% w/w as the potassium salt. Disadvantages of this process include the formation of by-products during isomerisation, the need to dilute the isohumulones to 2-3% in order to precipitate lupulones and subsequent concentration to reduce transport and storage costs.

Other solvent-free processes have since been disclosed, all of which involve isolation of the humulones from the hop extract prior to isomerisation. In U.S. Pat. No. 4,395,431 (Lance et al), liquid carbon dioxide extract is coated onto an inert hydrophobic support such as polyethylene powder. Humulones are then preferentially extracted from the coated extract with aqueous potassium carbonate giving a dilute solution of potassium humulate, which is then ready for further processing. Other processes, disclosed in GB-A-2187755 (Todd), EP-A-0173479 (Patel) and EP-A-0199101 (Hopstabil), involve mixing the hop extract with aqueous alkali directly. In all processes a resinous phase, depleted in humulones and an aqueous phase rich in humulones is claimed. In the case of EP-A-0199191, even though excess alkali was used, four extractions were required to achieve an efficient recovery of humulones. Alternatively GB-A-2187755 claims that less than one equivalent of potassium or sodium hydroxide as a 7% aqueous solution will remove all humulones in two extractions. However, in Examples 6.1 and 6.2 of this document, reported recoveries of humulone (when calculated) are 123% and 136% respectively. Recoveries of humulones in EP-A-0173479 were estimated by loss in weight of hop extract and not by analysis. Therefore, the extraction efficiencies claimed are meaningless.

According to the prior art, there are two main methods of isomerising humulones either (1) by action of heat on aqueous solutions of potassium or sodium humulate, GB-A-2022083, GB-A-2187755 and EP-A-0173479 or (2) so called solid state isomerisation, EP-A-0199101, AU-474830 and U.S. Pat. No. 4,395,431.

All these methods have substantial quantities of water associated with them during isomerisation. In the case of aqueous alkaline isomerisation, the concentration of humulones is 5-25%. For processes involving the action of heat on the solid magnesium humulate, the water content is variable (AU-474830 and U.S. Pat. No. 4,395,431) or 95% in EP-A-0199101. The presence of water during isomerisation leads to four problems, (a) increased size of plant due to the dilution, (b) formation of hydrolysis by-products, especially in the aqueous alkaline process, (c) energy requirements are greater because the process involves heating dilute solutions and (d) more energy is required in subsequent stages to effect concentration of the dilute solutions or drying of the solid salt. Thus, the presence of water increases the cost of the process and decreases the purity of the product.

Recent prior art has seen the development of processes to isomerise humulones in hops 'in situ' without the need for complicated extraction processes. In U.S. Pat. No. 4,123,561, alkaline earth metal oxides such as magnesium and calcium oxide are mixed with powdered hops and pelletised. During this process the more stable salts of the humulones are produced. Subsequent anaerobic heating of these salts (80° C. for 2 h) resulted in isomerisation to the corresponding metal salts of the isohumulates with over 90% efficiency. Problems were encountered, however, in the use of these isomerised pellets including the production of cheesy off-flavours in beer. Also the pellets tended to remain coherent during wort boiling, resulting in lower than expected hop utilisations. Energy requirements are likely to be less favourable because of the need to heat for 2 h at 80° C.

A new approach to this type of isomerisation process is disclosed in EP-A-0240210. Here powdered hops are mixed with a range of alkaline or alkaline earth metal salts and passed through an extrusion cooker. In this process, shear and high temperatures are used. Reaction times can be reduced to the order of 2 minutes. The product can be obtained as granules or as a fine powder. Use of this product in brewing has resulted in increases in hop utilisation of over 100% (i.e. 25 to 50%) without adverse effects on flavour.

The problems associated with these last two processes are that (a) the resulting isomerised products are not as pure as those obtainable from carbon dioxide extracts and (b) the concentration of isohumulones will rarely exceed 10% w/w.

SUMMARY OF THE INVENTION

The present invention concerns a procedure for the production of isohumulones from hop extract, preferably obtained by extraction using carbon dioxide.

According to the present invention there is provided a method for the production of an isomerised hop preparation which comprises mixing together hop extract with a solid alkaline or alkaline earth metal compound, and subjecting the resulting mixture to a temperature of at least 80° C. for a time sufficient to affect conversion of α-acid to iso-α-acid.

The alkali or alkaline earth metal compound may be, for instance, an oxide, a hydroxide, a carbonate or other salt of sodium, potassium, magnesium or calcium. Preferred compounds are magnesium compounds and a particularly preferred compound is magnesium oxide.

Preferably, the alkali or alkaline earth metal compound is used in an amount of 0.1 to 4 moles, more preferably 1 to 3 moles, for each mole of total α-acid present in the extract. Most preferably, the compound is used in an amount of about one mole per mole of total α-acid content.

Preferably, the mixture of extract and alkali or alkaline earth metal compound is maintained at a temperature in the range of 80° to 200° C., more preferably 120° to 140°, for sufficient time to complete the isomerisation process. The preferred temperature is about 130° C. At temperatures less than this, lower yields are obtained unless residence times are increased. The mixture is maintained at the preferred temperature for a period which is preferably in the range of 0.1 to 15 minutes. A more preferred period is 1 to 5 minutes.

The produce of the process may be highly viscous resin or a brittle, non-sticky solid which is readily ground to a fine yellow powder. The nature of the product is dependent upon (a) the humulone content of the hop extract and (b) the concentration of salt used.

DESCRIPTION OF THE PREFERRED EMBODIMENTS

Figure 1:
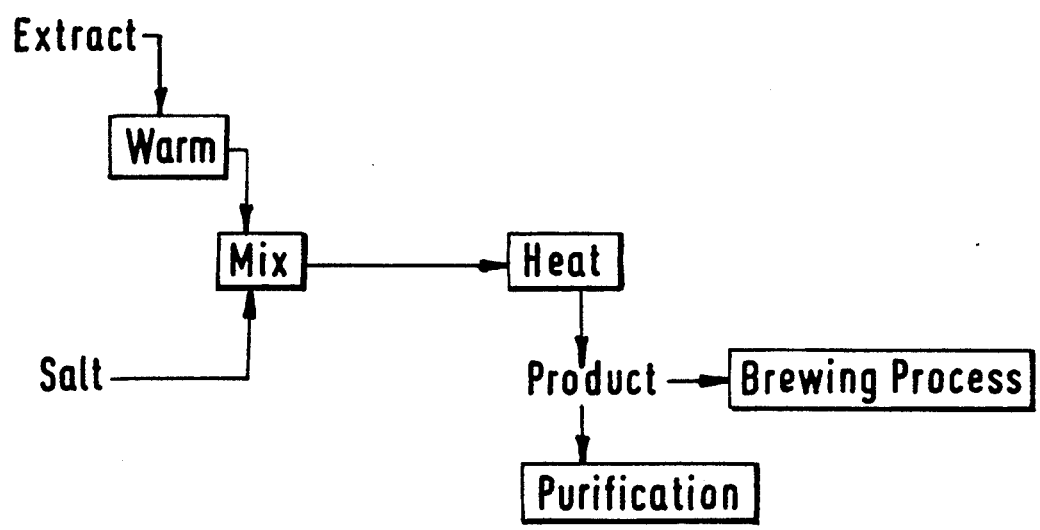

The process of the invention is simple and rapid, requiring no purification stages prior to or after isomerisation. The concentration of humulone or isohumulone may be in the range 10-60% but usually 35-50% as measured by high performance liquid chromatography (Buckee, G. K. Journal of the Institute of Brewing, 1985, 91, 143). The process does not necessitate the use of organic solvents or dilution with water so that costly concentration or drying steps are avoided. Due to the non-aqueous nature of isomerisation, very few by-products are detectable using high performance liquid chromatography, resulting in increased yields of isohumulones. The nature of the process is such that it is suitable for either continuous or batch production methods.

The isomerised product obtained by this process can be used in the kettle as a replacement for cone hops, hop pellets/powders, hop extracts, isomerised or stabilised hop pellets and hop extrudates. In addition, because of the lack of isomerisation by-products, material obtained from this process is ideal for the production of high purity isomerised extracts. These are prepared by acid digestion of the isomerised kettle extract followed by controlled extraction with an alkali such as potassium hydroxide. The water-soluble potassium isohumulate so formed can be added to beer 'as is', or as free acids after acidification, without the formation of haze. Use of these extracts post-fermentation or post beer filtration, will result in increased hop utilisations.

It is preferred that the process of the present invention results in an isohumulone content which is at least 14.5% of the original humulone content. More preferably the isohumulone content is at least 45.3% of the original humulone content in a continuous process and at least 19.5% in a batch process.

FIG. 1 shows a schematic outline of the continuous process as used in the preferred form. Hop extract, preferably obtained by extraction using liquid carbon dioxide containing 30-60% humulones but usually 40-50%, is mixed with an alkali or alkaline earth metal salt, preferably the carbonate, oxide or hydroxide, to provide an intimate mixture of salt and hop resins. The concentration of the salt can be variable, but is usually in the range of 1-3 mole equivalents based on the humulone content of the extract. The mobile hop resin/salt mixture can then be pumped through a heat exchanger and lagged holding coil, or through heated coils, or alternatively the mixture could be conveyed through an oven. Residence times can be varied by adjusting either (a) the length of the coil and, (b) the flowrate of the hop resin/salt mixture or speed of conveyor. Residence times in the preferred form of the invention are up to 10 minutes, but longer times may be required. The reaction will proceed within a wide range of temperatures. In order to effect efficient conversion of humulones in the desired residence time and using the preferred alkali concentration, temperatures in the range 100° C. to 140° C. are required although other temperatures may also be used. In the preferred form of the invention the isomerised product is obtained as a brown liquid which solidifies on cooling and is readily ground into a fine yellow powder. Conversions of humulones to isohumulones are high and can be quantitative, with no by-products formed as detected by high performance liquid chromatography.

Alternatively, this operation can be carried out as a batch process, in which admixed alkali and hop resins are stirred in a heated vessel under the desired conditions. The resulting product is of similar consistency and composition to that produced by the continuous process.

The product of the method of the present invention may be used in beer brewing processes and can be utilised at appropriate stages, for instance, post-fermentation or post-filtration.

Pilot-scale brewing trials have shown that when the isomerised products obtained using the above processes, are added to the kettle in the brewing process, the utilisations of bittering resins is 51-63%. This represents a substantial improvement in utilisation compared with use of a conventional liquid carbon dioxide extract in pilot scale brewing when the corresponding values are 20-25%.

The invention will now be described with reference to the following examples.

EXAMPLE 1

Continuous Process/Carbonates

Liquid carbon dioxide hop extract (41% w/w humulones) was warmed to 40° C.–45° C. to increase mobility and sufficient solid magnesium carbonate added to give a salt/humulone ratio of 2:1. This mixture was stirred until effervescence had ceased. The mixture was then pumped through a stainless steel coil (2.84 m × 5 mm internal diameter) placed in a heated glycol bath at 140° C.

The mixture was pumped at a rate so that the residence time within the heated coil was approximately 1.0 minute (portion (1)—Table 1). The product was obtained as a brown viscous liquid, which solidified upon cooling and could be ground into a fine yellow powder.

The product was analysed for humulones and isohumulones using the high performance liquid chromatography method of Buckee, G. K. (Journal of the Institute of Brewing 1985, 91, 143). A small sample of the product, approximately 0.5 g, was dissolved in methanol (50 ml) and aliquots taken and analysed according to the published procedure.

Variations on the above procedure for making the product were also employed and these are listed below.

Portion 2 Solid magnesium carbonate, salt/humulone ratio 2:1, temperature 140° C., residence time 5 minutes.

Portion 3 Solid magnesium carbonate, salt/humulone ratio 2:1, temperature 140° C., residence times 7 minutes.

Portion 4 Solid magnesium carbonate, salt/humulone ratio 1:1, temperature 120° C., residence time 2.0 minutes.

Portion 5 Solid magnesium carbonate, salt/humulone ratio 1:1, temperature 120° C., residence time 5.0 minutes.

Portion 6 Solid magnesium carbonate, salt/humulone ratio 1:1, temperature 140° C., residence time 1.0 minutes.

Portion 7 Solid magnesium carbonate, salt/humulone ratio 1:1, temperature 140° C., residence time 5.0 minutes.

Portion 8 Solid magnesium carbonate, salt/humulone ratio 1:1, temperature 140° C., residence time 7.0 minutes.

The products obtained from these experiments were analysed according to the procedures described above, the results of which are listed in Table 1.

TABLE 1

| | Continuous Process/Carbonates | | | | | |
|---|---|---|---|---|---|---|
| Portion | Salt/ Humulone Ratio (moles) | Temp (°C.) | Residence Time (mins) | Humulone (% w/w) | Iso-humulone (% w/w) | Conversion Humulone to Iso-humulone (%) |
| 1 | 2:1 | 140 | 1 | 10.4 | 25.3 | 71.7 |
| 2 | 2:1 | 140 | 5 | 3.3 | 32.3 | 91.5 |
| 3 | 2:1 | 140 | 7 | 2.8 | 34.5 | 92.5 |
| 4 | 1:1 | 120 | 2 | 25.3 | 11.5 | 31.3 |
| 5 | 1:1 | 120 | 5 | 20.0 | 17.6 | 46.8 |
| 6 | 1:1 | 140 | 1 | 20.3 | 16.8 | 45.3 |
| 7 | 1:1 | 140 | 5 | 8.9 | 27.4 | 75.5 |
| 8 | 1:1 | 140 | 7 | 8.3 | 28.1 | 77.2 |

Products obtained using a salt/humulone ratio of 1:1 were highly viscous, sticky resins which were not suitable for grinding.

EXAMPLE 2

Batch Process/Carbonates

In these studies, portions of warm liquid carbon dioxide hop extract (41% w/w humulones) were mixed with sufficient solid magnesium or potassium carbonate to give salt/humulone mole ratios of 1:1, 2:1 and 3:1. The mixtures were heated with stirring in an open vessel, under an atmosphere of nitrogen at 120° C. or 140° C. The reaction times were varied from 1 to 10 minutes. Products were analysed as described in Example 1 and the results are listed in Table 2.

TABLE 2

| | Batch Process/Carbonates | | | | | |
|---|---|---|---|---|---|---|
| Portion | Salt/ Humulone Ratio (moles) | Temp °C. | Reaction Time (mins) | Humulone (% w/w) | Iso-humulone (% w/w) | Conversion Humulone to Isohumulone (%) |
| 9 | 2:1 | 120 | 5 | 20.1 | 14.4 | 41.9 |
| 10 | 2:1 | 120 | 7 | 6.9 | 29.0 | 80.8 |
| 11 | 2:1 | 140 | 2 | 16.2 | 19.3 | 54.4 |
| 12 | 2:1 | 140 | 5 | 4.6 | 33.3 | 87.9 |
| 13 | 2:1 | 140 | 7 | N.M | 36.7 | 100.0 |
| 14 | 2:1 | 140 | 10 | N.M | 37.5 | 100.0 |
| 15 | 3:1 | 140 | 1 | 27.3 | 6.6 | 19.5 |
| 16 | 3:1 | 140 | 5 | N.M | 34.4 | 100.0 |
| 17 | 3:1 | 140 | 10 | N.M | 35.4 | 100.0 |
| 18 | 1:1(a) | 140 | 5 | 30.1 | 5.1 | 14.5 |
| 19 | 1:1(a) | 140 | 7 | 29.2 | 7.5 | 20.4 |
| 20 | 1:1(a) | 140 | 9 | 21.9 | 13.0 | 37.2 |

(a)Potassium carbonate (all other examples employed magnesium carbonate).
(b)N.M. — Not measurable
(c)Reaction times include warming up from ambient temperature.

EXAMPLE 3

Batch Process/Magnesium Oxide

In this Example, portions of liquid carbon dioxide extract (10 g; 44% w/w humulones) were mixed with solid magnesium oxide to give oxide/humulone mole ratios ranging from 0.75 to 2.0. These mixtures were then transferred to an open vessel which was immersed in a glycol bath heated to between 80° C. and 140° C. Products were analysed as described in Example 1 and the results are listed in Table 3.

TABLE 3

Batch Process/Magnesium Oxide

| Portion | Oxide/ Humulone Ratio (moles) | Temp (°C.) | Reaction Time (mins) | Humulone (% w/w) | Iso- humulone (% w/w) | Conversion Of Humulone To Iso- humulone (%) |
| --- | --- | --- | --- | --- | --- | --- |
| 21 |  |  | 2 | 35.8 | 8.7 | 19.6 |
| 22 | 0.75 | 120 | 4 | 13.0 | 32.9 | 71.7 |
| 23 |  |  | 6 | N.M | 44.1 | 100.0 |
| 24 |  |  | 2 | 10.0 | 35.9 | 78.2 |
| 25 | 1.00 | 120 | 4 | N.M | 43.7 | 100.0 |
| 26 |  |  | 6 | N.M | 43.8 | 100.0 |
| 27 | 1.25 | 120 | 2 | 3.3 | 41.1 | 92.3 |
| 28 |  |  | 4 | N.M | 45.7 | 100.0 |
| 29 | 1.50 | 120 | 2 | N.M | 44.6 | 100.0 |
| 30 |  |  | 4 |  | 45.7 |  |
| 31 | 2.00 | 120 | 4 | N.M | 42.3 | 100.0 |
| 32 |  |  | 5 | 36.3 | 8.2 | 18.4 |
| 33 | 1.00 | 80 | 10 | 12.4 | 33.1 | 74.4 |
| 34 |  |  | 15 | N.M | 44.8 | 100.0 |
| 35 | 1.00 | 100 | 5 | N.M | 43.6 | 100.0 |
| 36 |  |  | 10 |  | 45.4 |  |
| 37 | 1.00 | 140 | 5 | N.M | 45.9 | 100.0 |

Notes:
(1) N.M. = Not measurable
(2) Reaction times include warming from ambient temperature
(3) Products obtained using a 0.75 mole equivalent of magnesium oxide were brown, viscous resins. All other products were brown, non-sticky solids which could be ground to give a yellow powder.

EXAMPLE 4

Batch Process/Magnesium Oxide/Electric Oven

In this Example, portions of liquid carbon dioxide extract (10 g; 44% w/w humulones) were mixed with a one mole equivalent of solid magnesium oxide. These mixtures were then heated in an electric oven under varying conditions with respect to time and temperature. Products were analysed as described in Example 1 and the results are listed in Table 4.

TABLE 4

Batch Process/Magnesium Oxide/Electric Oven

| Por- tion | Temp. (°C.) | Reaction Time (Mins.) | Humulones (% w/w) | Isohum- ulones (% w/w) | Conversion of Humulone To Isohumulone (%) |
| --- | --- | --- | --- | --- | --- |
| 38 | 100 | 20 | N.M | 45.2 | 100.0 |
| 39 | 110 | 10 | N.M | 43.8 | 100.0 |
| 40 |  | 20 |  | 45.5 |  |
| 41 |  | 5 | 19.1 | 23.5 | 55.2 |
| 42 | 120 | 10 | N.M | 41.9 | 100.0 |
| 43 |  | 20 | N.M | 42.9 | 100.0 |

Notes:
(1) N.M. = Not measurable
(2) Reaction times include warming up from ambient
(3) All samples were obtained as non-sticky solids

EXAMPLE 5

Batch Process/Magnesium Oxide/Lamp

In a preferred form of the invention, liquid carbon dioxide extract (100 g; 44% w/w humulones) was mixed with one mole equivalent of solid magnesium oxide. This mixture was transferred to an aluminum tray and placed on a 500 watt tungsten-halogen lamp. The lamp was switched on for three minutes, during which the temperature of the resin rises from ambient to 130° C. After this time, the reaction was complete. Upon cooling, the mixture solidifed to give a brittle, non-sticky solid containing 41.6% w/w isohumulones.

EXAMPLE 6

Batch Process/Magnesium Oxide/Ethanol Extract

Two ethanol hop extracts, one containing 27.8% w/w humulones (Extract A) and the other 38.8% w/w humulones (Extract B) were treated as described in Example 3 (Portion 36). Extract A yielded a resinous product containing 28.0% w/w isohumulones. The product from Extract B was a brittle non-sticky solid containing 40.3% w/w isohumulones.

EXAMPLE 7

High Purity Isomerised Extracts (a) Acid Digestion

Isomerised kettle extract (97.5 g, 41.2% w/w isohumulones) prepared by the method described in Example 5, was ground to a fine yellow powder and transferred to a 1 liter three-necked flask, fitted with a tap at its base. Hydrochloric acid (500 ml, 2M) was then added and the mixture heated to 75° C. with stirring and under nitrogen. Heating and stirring were stopped after 30 minutes (keep mantle around flask) and the two phases were allowed to settle (15 minutes). The aqueous bottom layer was run off and replaced with dilute potassium chloride solution (300 ml, 3.3% w/w). Stirring was continued for 15 minutes during which time the temperature was raised to 50° C. followed by a further stand time (15 minutes) and removal of the bottom aqueous layer.

(b) Extraction of Isohumulones

A pH electrode was now incorporated into the flask. Distilled water (300 ml) pre-heated to 45°-50° C. was added to the resin and the mixture stirred. Potassium hydroxide solution (15% w/w) was then slowly added dropwise until pH reaches and remains steady at pH 7.7. The stirrer was then swtiched off and the two phases allowed to separate. The bottom aqueous phase containing isohumulones was then run off and replaced with distilled water (200 ml) pre-heated to 50° C. Stirring was continued for a further 15 minutes before allowing to stand and separating the aqueous phase. Both aqueous phases were combined and allowed to cool before filtering through glass wool.

At this stage, the bright, pale yellow solution (498.5 g) contained 7.53% w/w isohumulones (i.e. 92.8% yield). This solution can be added to beer 'as is' or concentrated by evaporation under reduced pressure.

Alternatively, the free acids were produced by precipitation with dilute hydrochloric acid (1M) adjusting to pH 2.25. The product was recovered by decanting off the aqueous phase and transferring the yellow oil to a rotary evaporator using a minimum quantity of ethanol, followed by evaporation to dryness. The final product was obtained as a bright yellow oil (37.5 g) containing 91.3% w/w isohumulones corresponding to a yield of 83.1%.

All products were analysed as described in Example 1.

Addition of 15 ppm of these high purity isomerised products to bright beer, produced no measurable increase in haze as determined using a Radiometer.

EXAMPLE 8

A Process for the Production of Beer Using Isomerised Kettle Extract

Beer was brewed on a pilot scale following a standard procedure (see Journal American Society Brewing Chemists 1976, 34, 166).

A test beer was produced by adding 7.6 g of isomerised kettle extract (Portion 3 of Example 1) having an iso-$\alpha$-acid content of 34.5% and a $\alpha$-acid content of 2.8% to 59 liters of wort having a specific gravity of 1.042 at the start of boiling. The total concentration of isohumulones and humulones added to the wort was 48.0 ppm.

A control beer was similarly produced using sufficient liquid carbon dioxide extract in the kettle at the start of boiling to give an initial concentration of 110 ppm of $\alpha$-acids in the wort (specific gravity 1.042).

Both worts were fermented with an ale yeast N.C.Y.C 1681 at an original gravity of 1038. The finished beer bittered using the isomerised kettle extract contained 23.6 ppm of iso-$\alpha$-acids giving a utilisation of 54.3%. In contrast, the control beer brewed with liquid carbon dioxide extract contained 22.8 ppm iso-$\alpha$-acids with a corresponding utilisation of 22.9%. Other analytical data for both beers is given in Table 5. No flavour defects could be detected in the test beer.

Accordingly, Example 3 shows that by using an isomerised kettle extract produced by the method described above, in the brewing process, a substantial improvement in hop utilisation is achieved (control beer 22.9% isomerised kettle extract beer 54.3% corresponding to an overall improvement in utilisation of 137%).

What is claimed is:

1. A method for the production of an isomerised hop preparation which comprises: in a solvent-free environment, mixing together a hop extract with a solid alkali or alkaline earth metal compound which is an alkali or alkaline earth metal salt, oxide or hydroxide and maintaining the resultant mixture at a temperature of at least 80° C. for a time sufficient to effect conversion of the $\alpha$-acid in said hop extract into the iso-$\alpha$-acid.

2. The method of claim 1 wherein the mixture is maintained at the temperature of at least 80° C. for from 1 to 5 minutes.

3. The method of claim 1 wherein the temperature is from 120°–140° C.

4. The method of claim 1 wherein the alkali compound is selected from one or more of bicarbonates, carbonates, oxides or hydroxides of sodium, potassium, magnesium or calcium.

5. The method of claim 4 wherein the alkali compound is an alkaline earth metal oxide.

6. The method of claim 1 wherein the mole ratio of salt to total $\alpha$-acid in the extract is from 0.1 to 4.

7. The method of claim 1 wherein the mole ratio of salt to total $\alpha$-acid in the extract is from 1 to 3.

* * * * *